(12) United States Patent
Boivie et al.

(10) Patent No.: US 7,580,370 B2
(45) Date of Patent: Aug. 25, 2009

(54) METHOD AND STRUCTURE FOR AUTOCONFIGURATION OF NETWORK DESTINATIONS

(75) Inventors: Richard H. Boivie, Monroe, CT (US); Nancy K. Feldman, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 10/176,045

(22) Filed: Jun. 21, 2002

(65) Prior Publication Data
US 2003/0235155 A1 Dec. 25, 2003

(51) Int. Cl.
*H04L 12/28* (2006.01)
(52) U.S. Cl. .................. 370/255; 370/254; 370/401
(58) Field of Classification Search ............. 370/254, 370/255, 401
See application file for complete search history.

(56) References Cited

U.S. PATENT DOCUMENTS

| | | | |
|---|---|---|---|
| 4,939,752 A | 7/1990 | Literati et al. | |
| 5,243,592 A * | 9/1993 | Perlman et al. | 370/252 |
| 5,289,176 A | 2/1994 | Novakovich et al. | |
| 5,461,608 A | 10/1995 | Yoshiyama | |
| 5,473,599 A | 12/1995 | Li et al. | |
| 5,704,032 A | 12/1997 | Badovinatz et al. | |
| 5,835,481 A | 11/1998 | Akyol | |
| 5,951,683 A | 9/1999 | Yuuki et al. | |
| 6,041,349 A | 3/2000 | Sugauchi et al. | |
| 6,047,330 A | 4/2000 | Stracke, Jr. | |
| 6,052,718 A | 4/2000 | Gifford | |
| 6,061,600 A | 5/2000 | Ying | |
| 6,092,214 A | 7/2000 | Quoc et al. | |
| 6,184,778 B1 | 2/2001 | Tsuji | |
| 6,192,397 B1 | 2/2001 | Thompson | |
| 6,195,705 B1 | 2/2001 | Leung | |
| 6,377,987 B1 | 4/2002 | Kracht | |
| 6,415,323 B1 | 7/2002 | McCanne et al. | |
| 6,487,605 B1 | 11/2002 | Leung | |
| 6,505,254 B1 | 1/2003 | Johnson et al. | |
| 6,611,872 B1 | 8/2003 | McCanne | |
| 6,631,420 B1 | 10/2003 | Li et al. | |
| 6,707,796 B1 | 3/2004 | Li | |
| 6,731,604 B1 * | 5/2004 | Chugo et al. | 370/238 |
| 6,754,220 B1 | 6/2004 | Lamberton et al. | |
| 6,823,395 B1 | 11/2004 | Adolfsson | |
| 6,826,165 B1 | 11/2004 | Meier et al. | |
| 6,845,091 B2 | 1/2005 | Ogier et al. | |
| 6,850,976 B1 | 2/2005 | Xia | |
| 6,954,436 B1 | 10/2005 | Yip et al. | |
| 6,956,816 B1 | 10/2005 | Alexander et al. | |
| 7,110,366 B2 | 9/2006 | Hulyalkar et al. | |
| 2001/0033550 A1 | 10/2001 | Banwell et al. | |

(Continued)

FOREIGN PATENT DOCUMENTS

JP 2001-034592 2/2001

(Continued)

*Primary Examiner*—Jason E Mattis
(74) *Attorney, Agent, or Firm*—McGinn IP Law Group, PLLC

(57) ABSTRACT

A method (and structure) for determining an optimal routing of data packets to subnet addresses in a network including a plurality of routers interrelated by a defined neighborhood relationship, includes, responsive to learning of a presence of a subnet, determining a distance between the subnet and each router.

13 Claims, 3 Drawing Sheets

U.S. PATENT DOCUMENTS

| | | |
|---|---|---|
| 2002/0018448 A1 | 2/2002 | Amis |
| 2002/0032025 A1 | 3/2002 | Maeshima |
| 2002/0042693 A1 | 4/2002 | Kampe et al. |
| 2002/0101873 A1 | 8/2002 | Perlman et al. |
| 2002/0147842 A1* | 10/2002 | Breitbart et al. ............. 709/241 |
| 2002/0159398 A1 | 10/2002 | Yamada et al. |
| 2002/0163884 A1* | 11/2002 | Peles et al. ................. 370/229 |
| 2003/0046427 A1 | 3/2003 | Goringe et al. |
| 2003/0088696 A1 | 5/2003 | McCanne |
| 2003/0101278 A1* | 5/2003 | Garcia-Luna-Aceves et al. . 709/240 |
| 2003/0112808 A1* | 6/2003 | Solomon .................... 370/400 |
| 2004/0010616 A1 | 1/2004 | McCanne |

FOREIGN PATENT DOCUMENTS

| | | | |
|---|---|---|---|
| WO | WO 01/28165 A1 | 4/2001 | |

* cited by examiner

METHOD AND STRUCTURE FOR AUTOCONFIGURATION OF NETWORK DESTINATIONS

CROSS-REFERENCE TO RELATED APPLICATIONS

The present Application is related to the following co-pending applications:

U.S. patent application Ser. No. 10/176,044, filed on Jun. 21, 2002, to Boivie et al., entitled "METHOD AND STRUCTURE FOR AUTOCONFIGURATION OF OVERLAY NETWORKS BY AUTOMATIC SELECTION OF A NETWORK DESIGNATED ROUTER", having IBM Docket YOR920010620US1; and U.S. patent application Ser. 10/176,043, filed on Jun. 21, 2002, to Boivie et al., entitled "METHOD AND STRUCTURE FOR AN AUTOCONFIGURATION TOPOLOGY CALCULATION", having IBM Docket YOR920010621US1, both assigned to the present assignee, and both incorporated herein by reference.

BACKGROUND OF THE INVENTION

1. Field of the Invention

The present invention generally relates to automatic configuration of a computer network, and more specifically to determining an optimal routing to network destinations. A local router is automatically designated for each subnet currently on-line by determining which on-line router is closest to the subnet. Network routers determine distance to each identified subnet (destination) and, after exchanging subnet distance information with neighboring routers, decide whether the next hop to that subnet should be directly to the subnet or to one of its neighboring routers.

2. Description of the Related Art

An overlay network is a "virtual network" that resides on top of another network. This "virtual network" usually needs to be configured, so that the overlay routers know of each other, as well as the destinations within the overlay network. This network configuration process is typically manual. Should an overlay router drop off-line, the overlay network can be incapacitated.

FIG. 1 shows a simplistic exemplary overlay network. A network (solid lines) interconnects a plurality of nodes N. The overlay network (dotted lines) consists of only certain nodes of the network, shown in FIG. 1 as overlay router nodes $O_{1}$. Network destinations, e.g., Internet Provider (IP) subnets S, are also shown on the figure. Each subnet would typically have an associated host/server computer (not shown), which is the contact to that subnet from the overlay network.

An overlay network is conventionally configured by a manual process, which has the disadvantage that the network will not be able to respond to changing conditions such as routers dropping off line or coming online or an interruption of an internodal communication link. More specific to the present invention, even having a configured overlay network provided, there needs to be a method of determining an optimal routing to the various subnets S. That is, if a router receives a data packet addressed to a specific subnet $S_x$, the router must be able to determine how best to forward that data packet.

More specifically, network destinations, meaning the IP subnets S, are conventionally configured to be "local" to particular routers of an overlay network. This configuration is static. While the destination is advertised throughout the network, and many paths may be taken, the last hop for the destination will always be the "locally" configured router. However, this may not be the best last hop for a particular destination. Moreover, the locally configured router may be "down".

SUMMARY OF THE INVENTION

In view of the foregoing problems, drawbacks, and disadvantages of the conventional systems, it is an object of the present invention to provide a method (and structure) in which network routers automatically determine an optimal routing to each known subnet within the network.

It is another object of the present invention to provide a method in which each subnet "local" router is identified on the network.

The first of the above-listed co-pending applications describes a network autoconfiguration method in which a router is automatically selected to serve the role as a designated network router in an overlay network. Independent of this automatic selection, the second co-pending application describes exemplary mechanisms to establish (and update as appropriate) a current network topology that defines the network neighbor relationships for routers currently on-line in the overlay network, even though the network changes configuration by having different routers on-line at any one time.

Independent of either of the above co-pending applications, the present invention continues the concept of network autoconfiguration by describing a method to determine an optimal routing to subnets on the overlay network, even as the overlay network changes over time.

To achieve the above goals and objectives, in a first aspect, the present invention teaches a method (and structure) for determining an optimal routing of data packets to subnet addresses, the network comprising a plurality of routers interrelated by a defined neighborhood relationship, including, responsive to learning of a presence of a subnet, determining a distance between the subnet and each router.

In a second aspect, the present invention teaches a network of routers that can execute the above-described method.

In a third aspect, the present invention teaches a signal-bearing medium tangibly embodying a program of machine-readable instructions executable by a digital processing apparatus to perform the above-described method.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
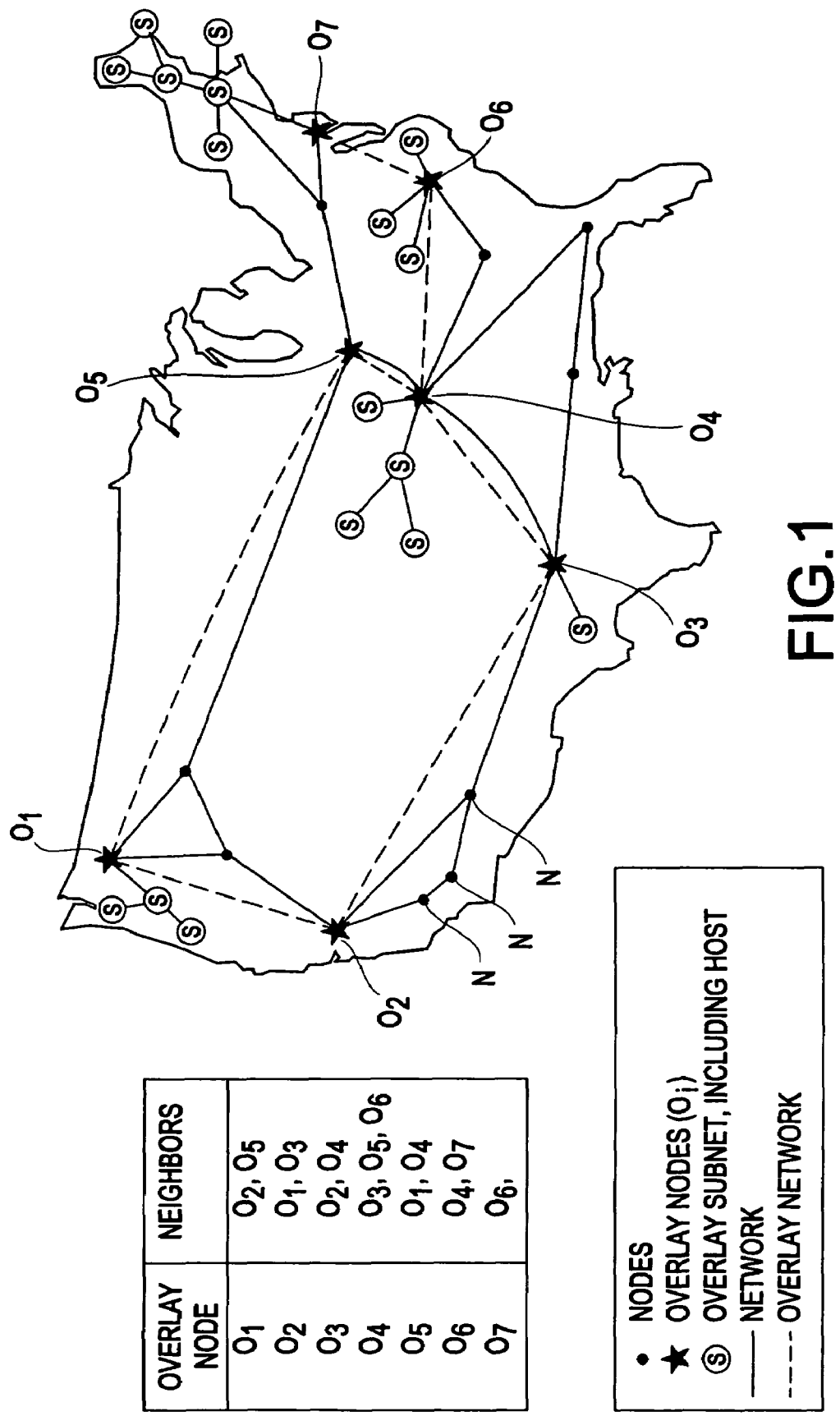
FIG. 1 shows a simplistic exemplary overlay network.

Referring now to the drawings, an exemplary embodiment of the present invention will now be described. FIG. 1 shows a simplistic exemplary network (dotted lines) having a plurality of routers $O_1$-$O_7$ as nodes, along with a plurality of subnets S.

It is assumed in this discussion that the overlay network such as shown in FIG. 1 has already been established so that the neighbor relationships among the routers $O_1$-$O_7$ has been established by some method, including possibly even manual configuration. Therefore, even though the present invention can be used to further extend the autoconfiguration techniques discussed in both of the listed co-pending applications, it is dependent upon neither of these since the present invention can be practiced as an autoconfiguration technique in any network.

The network autoconfiguration problem to be solved in the present invention is that of establishing efficient routing of data packets to the various subnets. That is, each router in the overlay network needs to know what to do with a data packet bound for one of the subnets. For each router, there are only two options. First, the router might be the router currently on-line closest to that subnet and, therefore, the router most ideal to serve as the local (last hop) router for the subnet. In that case, the router should forward the data packet directly to the subnet host/server computer. Second, if routing through another network router is better, the data packet should be forwarded to the neighboring router which provides that better routing.

Figure 2:
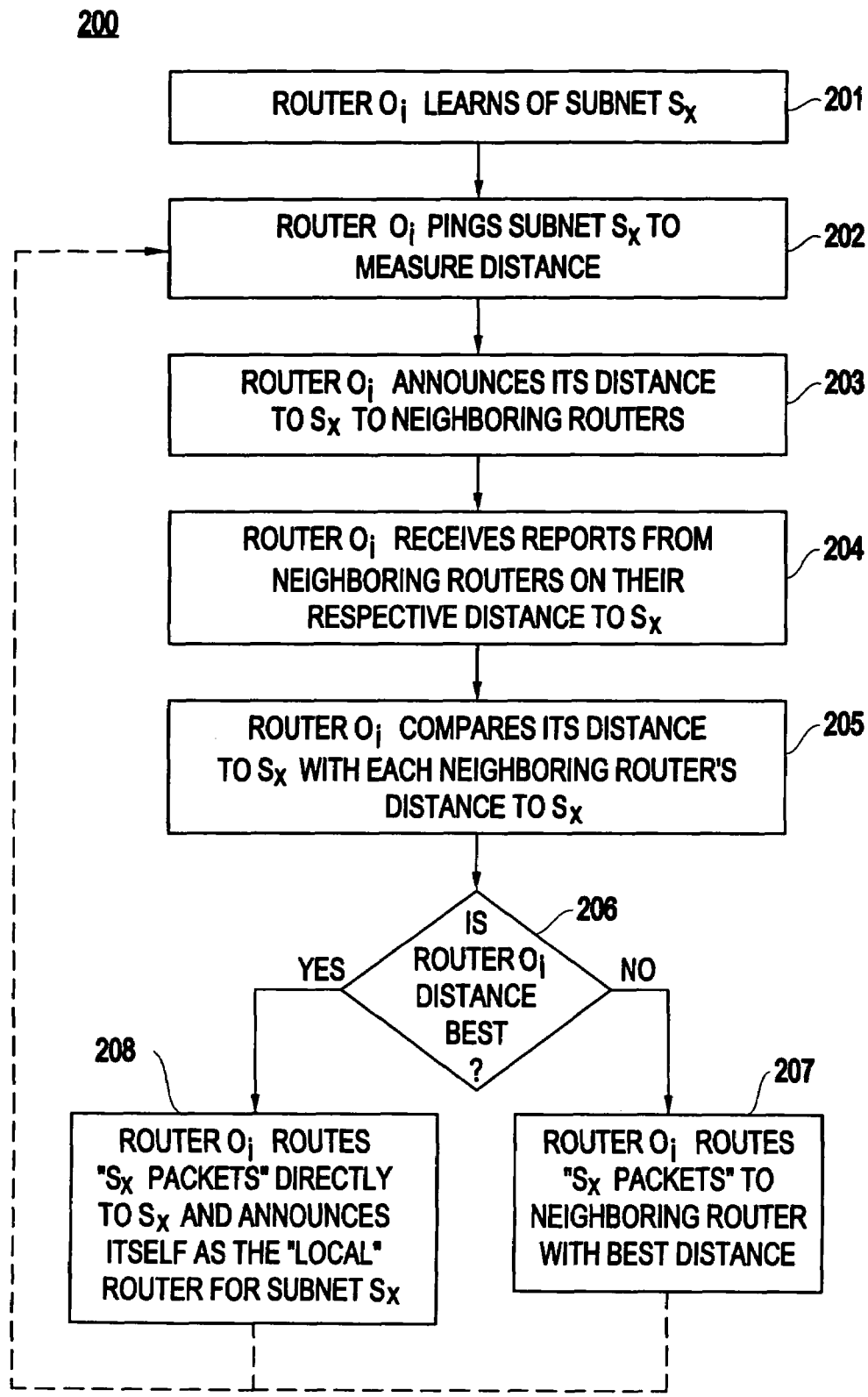
FIG. 2 is a flowchart illustrating an exemplary embodiment of the present invention.

According to an exemplary preferred embodiment 200 of the present invention illustrated in FIG. 2, in step 201, each overlay router $O_1$ may start by knowing destinations (IP subnets: IP addresses with corresponding netmasks). These can be learned, for example, via a static configuration file via a routing protocol or via other network traffic.

In step 202, whenever router $O_1$ learns of a host on subnet $S_x$, it will do a predetermined number of pings to that host to determine the distance to the subnet (i.e., to the subnet host/server) in milliseconds and, in step 203, will advertise this distance in its route protocol messages to its neighbors. When other routers hear about this subnet $S_x$, they will also ping to determine their distance to the subnet and similarly advertise the distance. In steps 204-206, router $O_1$ receives distance reports from neighboring routers and compares these distances with its own distance. If a neighboring router has a better distance, in step 207, router $O_1$ will route $S_x$-bound packets to that neighboring router as being the next hop. If router $O_1$ determines that it has the best distance of all its neighboring routers, in step 208, it considers subnet $S_x$ as being "local" and advertises itself as being the local (last hop) router for the subnet. It is noted that the best last hop router could actually be several hops away if, for example, the overlay network does not communicate directly with the subnet.

Thus, over time, by storing the subnet identifications and the corresponding next hop in a local routing table, each router develops its procedure to take whenever it receives a packet for any subnet currently available to the overlay network. A next hop is the neighbor to which packets bound for a destination are forwarded. By each router passing the subnet's presence on to other routers via route protocol messages, eventually all routers will develop their own best route to the subnet as based on the current network configuration.

Since the routers need to know the address of a host to which they can ping for the various subnets, the advertisement of a subnet in the routing protocol will also contain the 32 bit IP address of a host that can be pinged.

If an overlay router needs to forward a packet to a destination that the router does not know how to get to (i.e., is not in the local routing table), the router may either "blackhole" the packet (i.e. drop it), or use the standard route table in the network on which the overlay network is built.

The routes that are advertised in the route protocol message might use a two-part metric. The first part indicates the distance in milliseconds between a given subnet and the "last hop" overlay router (i.e., the router that has the shortest distance to the destination). The second part is optional and indicates the distance between the "last hop router" and the "current" router.

That is, the first part is used to determine which router is closest to the subnet. Traffic normally will be forwarded towards the router currently closest to the destination. The second part may be used to break ties when a router gets an advertisement from multiple neighbors for a particular destination and the first part of the metric is the same. Alternatively, a more complicated algorithm may be computed that uses both metrics to determine the shortest distance.

The routers can re-ping periodically to determine if the distance to a given subnet has changed (see dotted lines in FIG. 2). This feature is important so that routers can adapt appropriately to changes in the underlying network topology. Additionally, if an existing subnet host/server drops off-line, the address of a host can disappear.

There are three common ways by which the routers can find out about other hosts on the network. First, another host can announce itself to the router. Second, a router can find out about a new host via a route protocol message from a neighbor router. Third, a router can find out about a host in forwarding a data packet, i.e., when a router has to forward a packet to a given destination address, it can update the host address associated with the corresponding route table entry.

Since there may be a large number of subnets to be pinged, it might be important to limit the amount of pinging that gets done within a given time period so that there is sufficient CPU bandwidth for other things like sending and receiving route protocol messages and forwarding data packets.

The amount of pinging can be limited in several ways. For example, the amount of pinging that gets done within a given time period can be limited, and thus, the time it takes to get around and ping all of the subnets can be appropriately spread out over time. This technique might decrease the responsiveness of overlay routing to changes in the underlying topology but this can be a useful tradeoff if it allows the routers to keep up with all their packet forwarding and route protocol work.

Another possibility is to ping only the "active" subnets and not bother pinging a subnet if there has been no traffic going to that subnet. It is also possible to combine these two concepts and ping only a subset of the active subnets within a given time period and spread out the amount of time it takes to ping all the active subnets.

If a router pings a subnet and the distance to that subnet is better than the currently known closest router's distance, the router can start advertising that distance in the route protocol messages. If the distance is not better than that of the known closest router, the router should not advertise the new distance. When the distance between a router and a subnet increases and the router is the closest router to that subnet, the router should advertise the new distance, since the previously advertised distance is no longer accurate.

The neighbor relationships can change while the route protocol is running. But this is not a problem. If a neighbor becomes a non-neighbor, this is exactly like the case in which the link to the neighbor goes down and will be handled similarly, i.e., the routes through that neighbor will time out. If a non-neighbor becomes a neighbor, this is exactly like the case in which a link between two neighbors that had been down comes up and will be handled similarly, i.e., a node may acquire some new routes through the new neighbor.

There are variations that can be incorporated into the exemplary techniques described above. For example, the routers may use "split horizon" to avoid any two node route loops. "Split horizon" means that a router will not advertise a route to a neighbor if that neighbor is the next hop for the route.

A router may also be programmed to choose to remember a subnet and a pingable host on the subnet even if the subnet becomes unreachable, so that the router does not have to reacquire the host address and the netmask when the net becomes reachable.

Finally, it is also noted that a number of more general variations of the description above can be used. For example, although "ping" is described as the exemplary preferred method for determining distances, it is noted that other methods may be used and that distance measurements other than milliseconds may be used.

It is also noted that the present invention can be generalized even more by recognizing that distance, as measured by pinging, is only one obvious parameter to consider for autoconfiguring optimal routing to subnets. For example, metrics other than distance may be useful in determining an optimal routing of data packages to subnets such as network bandwidth, reliability or noise of the intercommunication links or the current traffic activity of individual network routers or network legs. Thus, in the present invention "distance" is intended to generally refer to any parameter or combination of parameters that can be quantified and measured and that would be a factor in deciding which possible routing in an overlay network would be an optimal routing to a subnet.

Additionally, in the exemplary preferred embodiment just described, each router itself may execute the decision process for determining the best routing to each subnet. This feature (i.e., that individual routers themselves decide the appropriate routing) has an advantage in efficiency, not only in its inherent simplicity and speed, but also since each router can determine its own appropriate action to take upon learning of a subnet $S_x$, there is no need to dedicate computer resources to assimilate all of the various reports and then calculate and communicate an optimum set of instructions to each router on the network as network configuration changes. But it is noted that this feature of having each router perform its own calculations is not a requirement to the present invention, since the execution of the calculations could occur in alternate computer locations, such as the router serving as the current designated network router or, under some circumstances, even the subnet host/server.

Finally, it is also noted that, although in the preferred embodiment the awareness of the subnet's presence on the network occurred in each router, which then proceeded to determine distance by pinging, other variations are possible. For example, all routers could be directly commanded by the first router to learn of the subnet's presence or by the designated network router.

Exemplary Hardware Implementation

Figure 3:
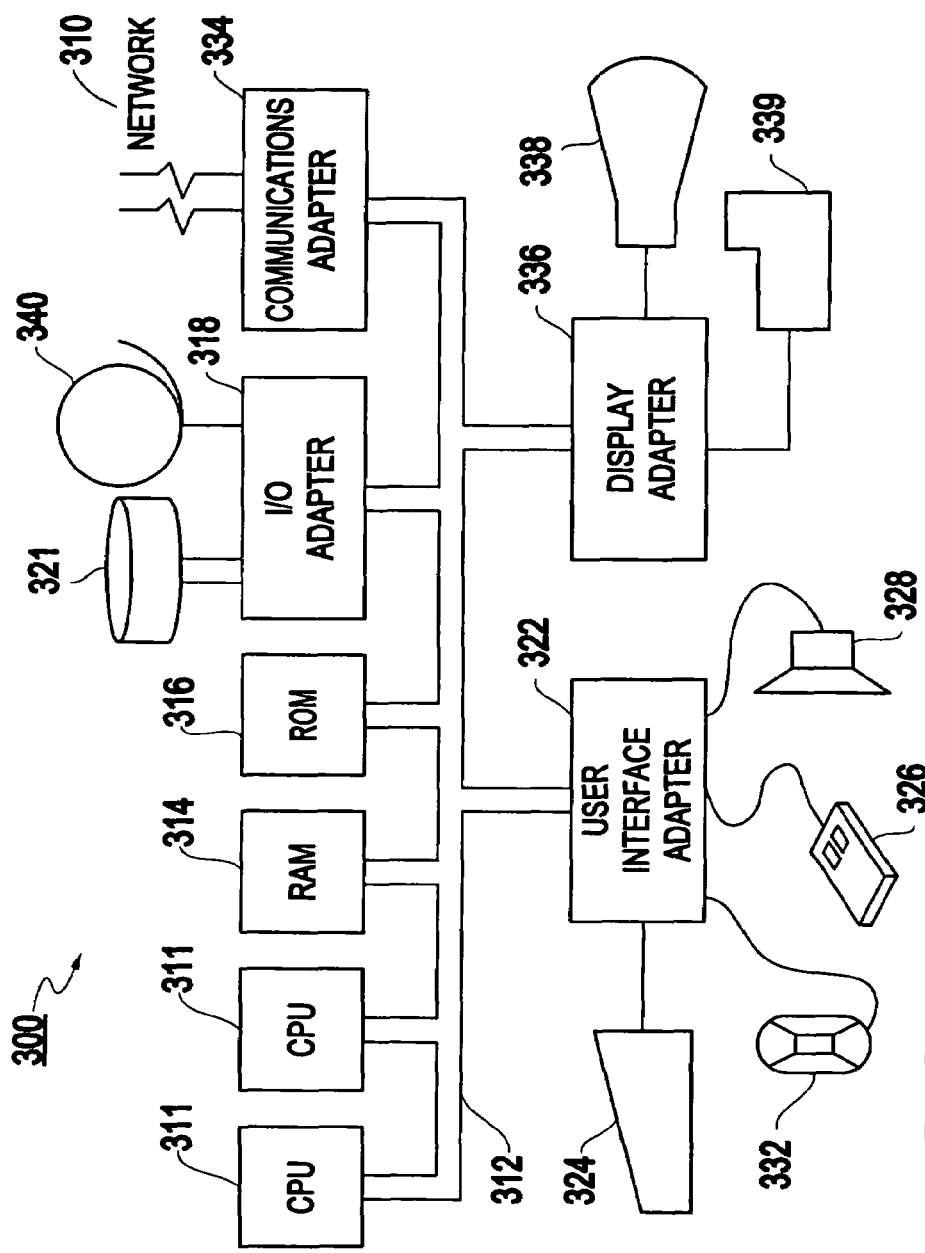
FIG. 3 illustrates an exemplary hardware/information handling system 300 for incorporating the present invention therein.

FIG. 3 illustrates a typical hardware configuration of an information handling/computer system 300 that could be used as a router to embody the present invention. The computer system 300 would be interconnected to other routers through network linkage 310 and which preferably has at least one processor or central processing unit (CPU) 311.

The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., and a display adapter 336 for connecting the bus 312 to a display device 338 and/or printer 339 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 311 and hardware above, to perform the method of the invention.

Figure 4:
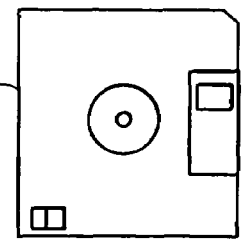
FIG. 4 illustrates a signal bearing medium 400 (e.g., storage medium) for storing steps of a program of a method according to the present invention.

This signal-bearing media may include, for example, a RAM contained within the CPU 311, as represented by the fast-access storage for example. Alternatively, the instructions may be contained in another signal-bearing media, such as a magnetic data storage diskette 400 (FIG. 4), directly or indirectly accessible by the CPU 311.

Whether contained in the diskette 400, the computer/CPU 311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital or analog wireline or wireless communication links. In an illustrative embodiment of the invention, the machine-readable instructions may comprise software object code. It should also be obvious that the instructions of the present invention can also be downloaded to the various network routers via the network input to that router.

With its unique and novel features, the present invention provides a method to extend network autoconfiguration to include determination of optimal routing to network destinations. While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of determining an optimal subnet data-packet-routing in an overlay network comprising a plurality of routers interrelated by a defined neighborhood relationship, by automatically determining an optimal router from said plurality of routers to serve as a local router that will communicate directly to said subnet, said method comprising:

responsive to learning of a presence of a subnet not previously recognized by said overlay network, determining a distance between said subnet and each router in said plurality of routers; and determining a router having a smallest distance to said subnet to serve as the local router for said subnet for purpose of said overlay network.

2. The method of claim 1, further comprising:
determining, for each said router in said overlay network, an optimal routing procedure to use when said router receives a data packet addressed to said subnet, said optimal routing procedure defining whether each said router should forward said data packet directly to said subnet or to a neighboring router.

3. The method of claim 2, further comprising:
for each router in said overlay network having more than one neighboring router, determining a specific one of said neighboring routers to forward said data packets addressed to said subnet, if said optimal routing procedure for data packets to said subnet comprises forwarding said data packets to a neighboring router.

4. The method of claim 1, further comprising:
in a first router of said overlay network, responsive to learning of a presence of said subnet, communicating with said subnet to allow said first router to measure a distance $D_0$ between said first router and said subnet; and
transmitting distance $D_0$ to each router $R_i$ (where i is an integer equal to or greater than one) defined as being a neighbor of said first router.

5. The method of claim 4, further comprising:
in each neighbor router $R_i$, communicating with said subnet to allow each router $R_i$ to measure a respective distance $D_i$ to said subnet.

6. The method of claim 5, wherein an optimal routing procedure for said first router comprises:
sending said data packets from said first router directly to said subnet, if said distance $D_0$ is smallest of all said distances $D_i$; and
sending said data packets from said first router to whichever neighboring router $D_i$ has the smallest distance $D_i$, if said distance $D_0$ is not smallest of all said distances $D_i$.

7. The method of claim 6, further comprising:
designating said first router to be a local router for said subnet if said distance $D_0$ is smallest of all said distances $D_i$.

8. The method of claim 6, wherein each said neighboring router $R_i$ transmits its said respective distance $D_i$ to said first router and a determination of an optimal routing for said first router to said subnet occurs in said first router.

9. The method of claim 4, wherein said distance $D_0$ is determined by pinging to said subnet to determine a time interval.

10. The method of claim 4, further comprising:
periodically repeating said communicating to determine whether said optimal routing should be revised.

11. The method of claim 1, wherein each said router of said overlay network, responsive to learning of said subnet in any manner, determines a distance between itself and said subnet, and each said router determines its own optimal routing to said subnet as based on comparing its distance from said subnet with distances of any neighboring routers from said subnet.

12. A computer for determining an optimal routing of data packets to subnets in an overlay network by automatically determining whether it should itself serve as a local router to communicate directly to a subnet, said overlay network comprising a plurality of routers organized by a relationship defining how said plurality of routers are related as neighboring routers, said computer comprising:
an awareness module for learning of a presence of a subnet not previously recognized by said overlay network;
a receiver to receive data packets addressed to said subnet and transmissions from any neighboring router of said overlay network;
a transmitter for communicating with said subnet and with any neighboring router of said overlay network;
a timing detector for determining from said communication a time interval corresponding to a distance to said subnet; and
a calculator for using said time interval to determine an optimal routing procedure to use whenever receiving a data packet addressed to said subnet, said optimal routing procedure defining whether to transmit said data packet directly to said subnet or to transmit said data packet to a neighboring router of said overlay network, an optimal routing determined by comparing said distance to said subnet with a distance to said subnet as reported by each neighboring router.

13. The computer of claim 12, further comprising:
a timer such that said communication with said subnet is periodically repeated to determine a current distance to said subnet.

* * * * *

UNITED STATES PATENT AND TRADEMARK OFFICE
CERTIFICATE OF CORRECTION

PATENT NO. : 7,580,370 B2  Page 1 of 1
APPLICATION NO. : 10/176045
DATED : August 25, 2009
INVENTOR(S) : Boivie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1397 days.

Signed and Sealed this

Fourteenth Day of September, 2010

David J. Kappos
*Director of the United States Patent and Trademark Office*